ial view of a windrow harvester incorporating the novel suspension and operating linkage with the hydraulic cylinder broken away and shown in section;

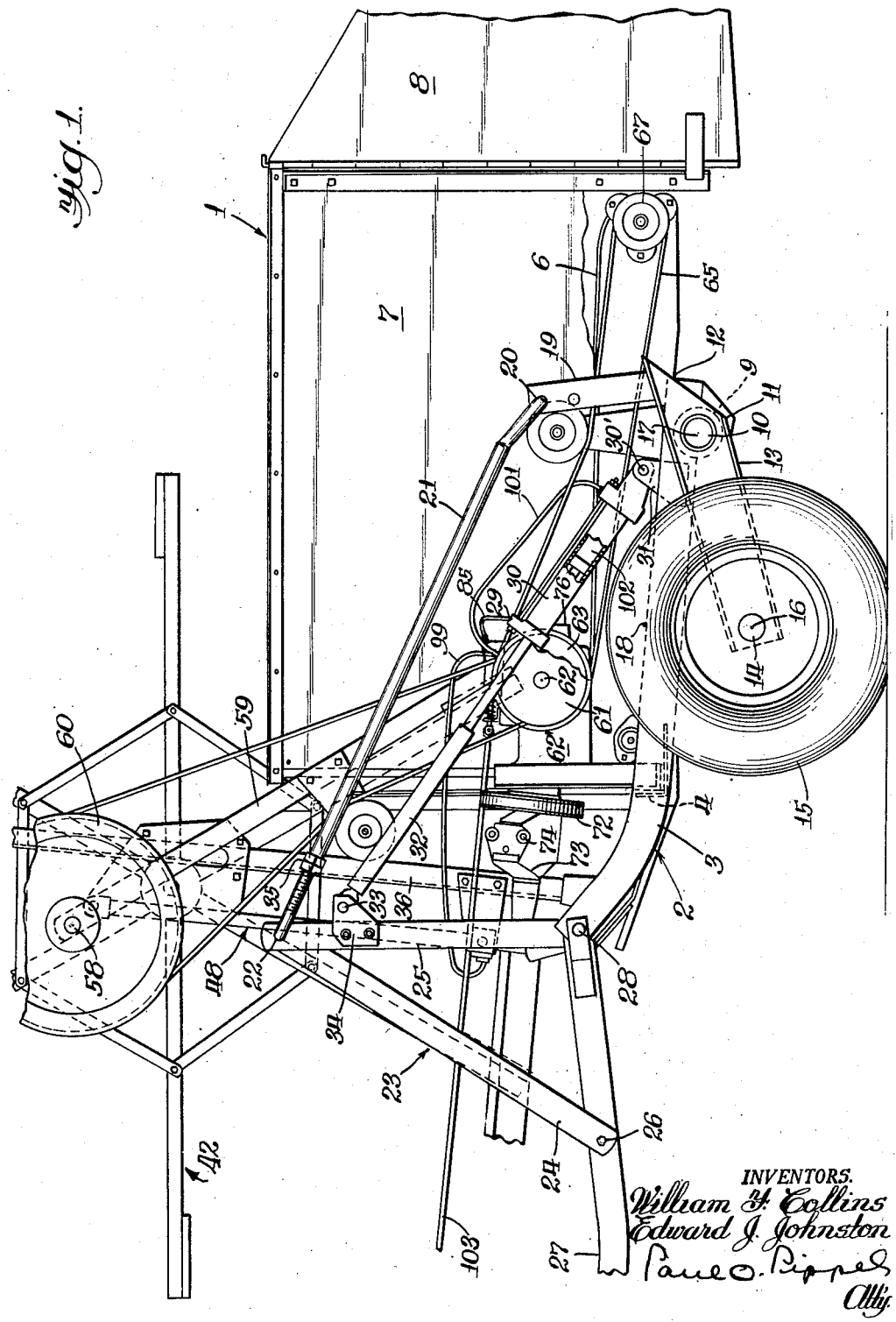

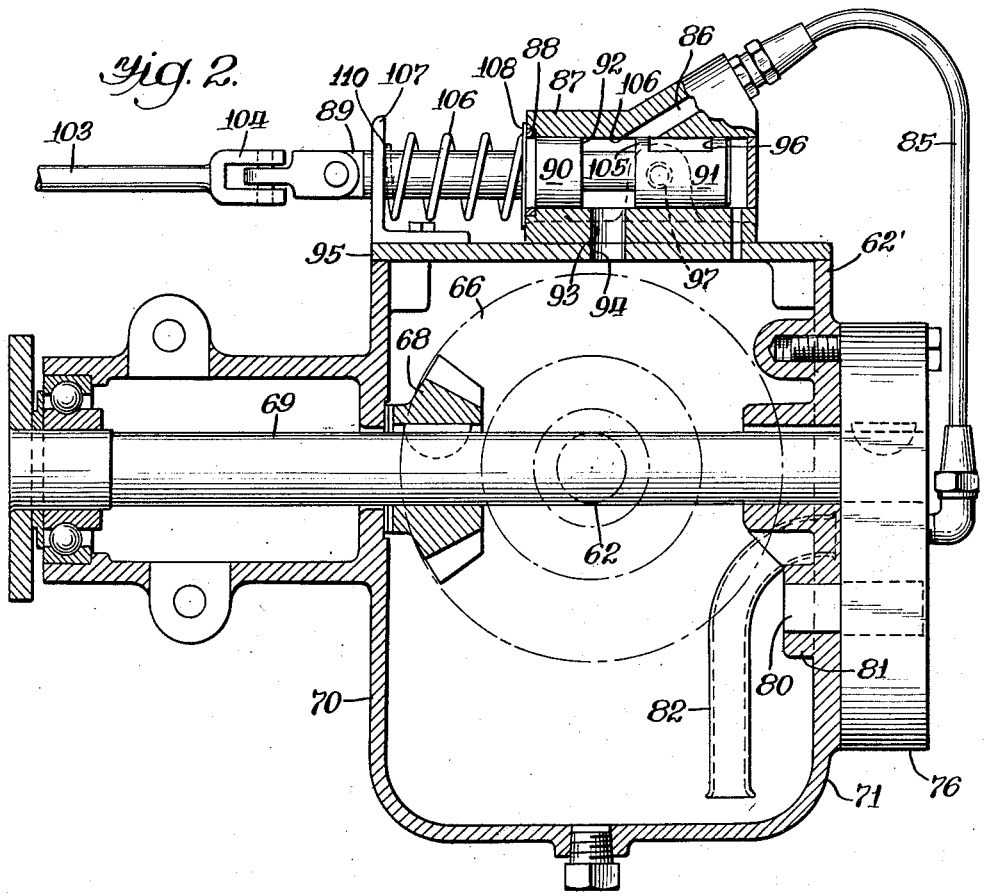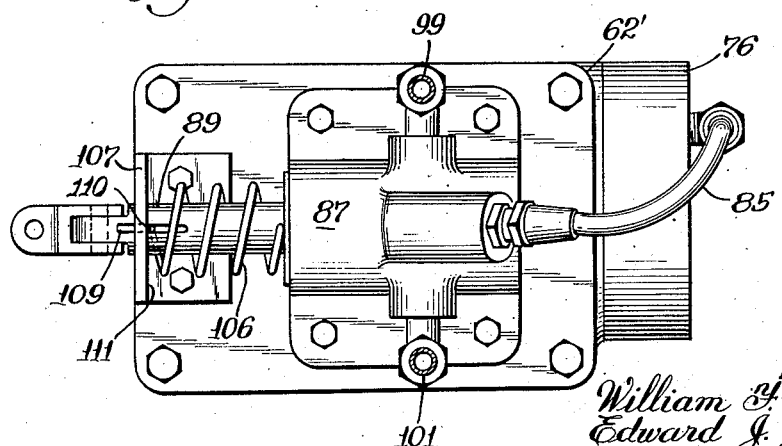

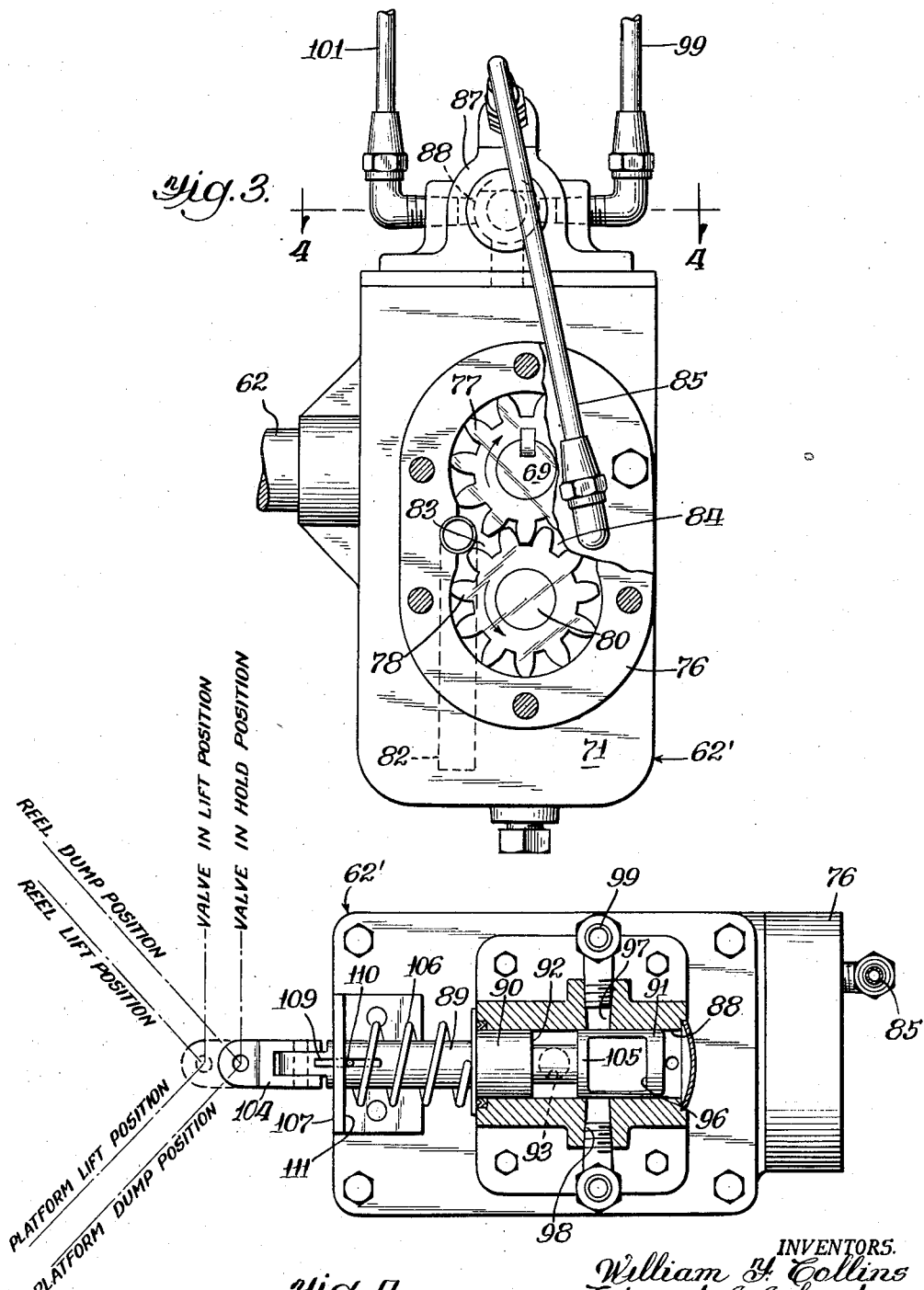

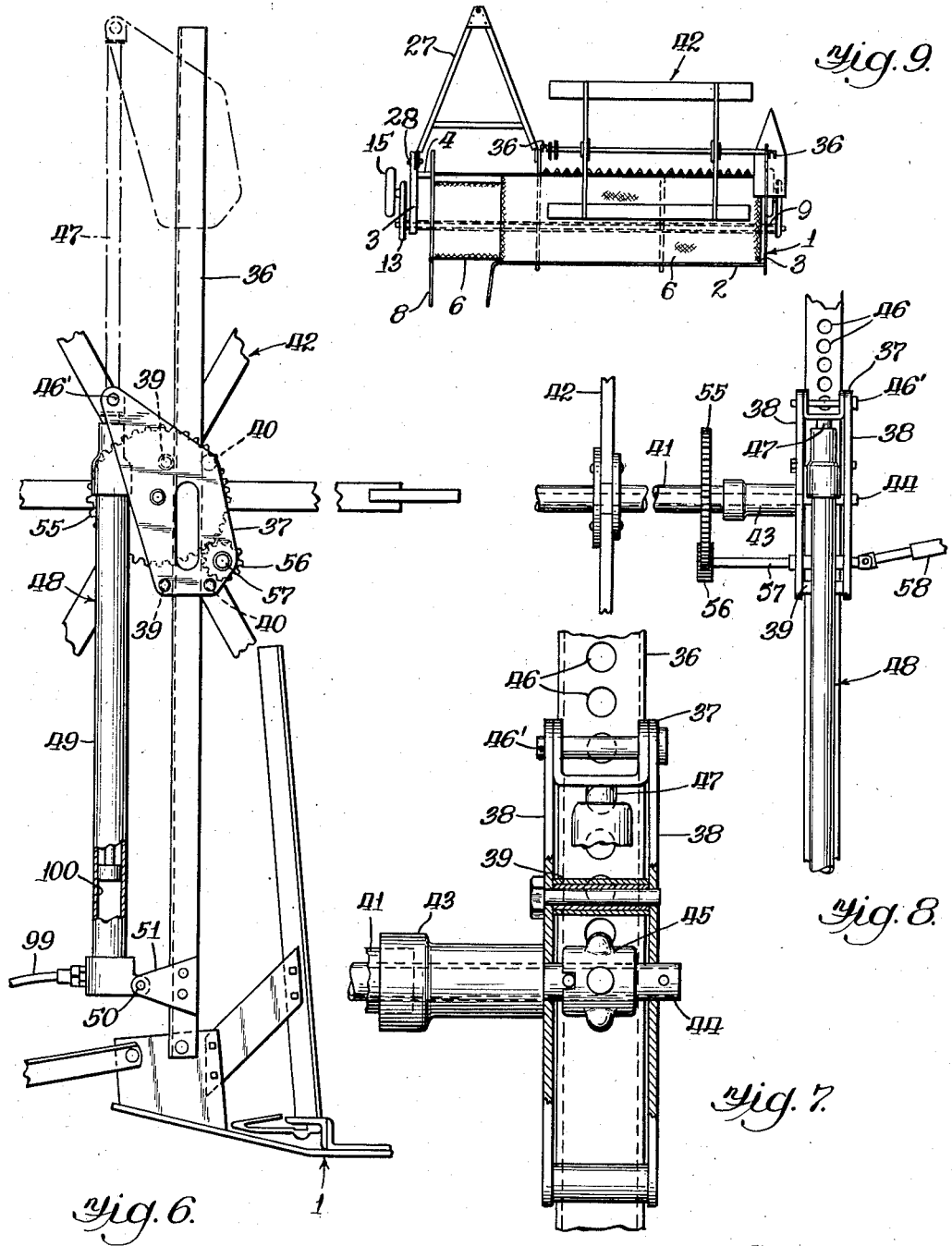

United States Patent Office 2,817,942
Patented Dec. 31, 1957

2,817,942

WINDROWER WITH HYDRAULIC PLATFORM OPERATING MEANS

William F. Collins, Downers Grove, and Edward J. Johnston, Chicago, Ill., assignors to International Harvester Company, a corporation of New Jersey Application August 19, 1953, Serial No. 375,134

1 Claim. (Cl. 56—208)

This invention relates to harvesters, such as windrowers and more specifically to a novel hydraulic system incorporating novel operating linkage for the reel and platform.

A general object of the invention is to devise a simple and effective hydraulic system which utilizes a single valve for raising, lowering, and holding the platform and the reel of the harvester in various positions.

A more specific object is to provide a novel suspension for a windrow harvester comprising a rock shaft extending lengthwise of the windrower and connected at opposite ends to the elbows of bell crank levers which have forwardly extending arms upon which are mounted support wheels for the harvester, the levers having upwardly extending arms which with the windrower platform structure form parts of a parallelogram linkage, said linkage embodying a diagonal piston and cylinder which functions to raise and lower the platform by changing the angular relationship of the linkage elements.

These and other objects of the invention will become more apparent from the specification and the drawings, wherein:

Figure 1 is a side-elevational view of a windrow harvester incorporating the novel suspension and operating linkage with the hydraulic cylinder broken away and shown in section;

Figure 2 is an enlarged vertical sectional view through the control valve and the gear case forming the reservoir for the hydraulic system;

Figure 3 is an end view of the structure shown in Figure 2 with parts of the case broken away to illustrate the gear pump;

Figure 4 is a horizontal sectional view taken substantially on line 4—4 of Figure 3 through the valve and showing diagrammatically various positions of the valve;

Figure 5 is a plan view of the structure shown in Figure 2;

Figure 6 is a fragmentary side-elevational view of the reel assembly;

Figure 7 is an enlarged fragmentary vertical sectional view of the structure of Figure 6;

Figure 8 is a fragmentary front view on a reduced scale of the structure of Figure 6; and Figure 9 is a diagrammatic plan view of the windrower.

Inasmuch as much of the structure and mechanism of the instant windrower are of conventional nature, no attempt has been made to be complete in the illustration of all details. It is presumed that the design and construction details will be apparent from the illustrations and following description.

The windrower or swather, generally indicated 1, constructed in accordance to the present invention comprises a generally rectangular main supporting frame 2, including a fore and aft extending end member or beam 3 at each end interconnected by a transverse front beam member 4 which constitutes a harvester platform carrying the conveyor mechanism 6 which discharges through the rear of the platform along the upstanding guide panel 7 at the stubbleward end of the unit, the panel 7 hingedly supporting a swath control baffle 8.

The foundation support structure 2 incorporates a transverse tube 9 located intermediate the forward and rear edges of the platform and weld-connected to the end members or elements 3 and disposed rearwardly of the center of gravity of the platform, and within the tube 9, a rock shaft 10 is rotatably mounted, said shaft 10 having each end projected beyond the adjacent member 3 and connected to an elbow 11 of a bell crank lever 12 which has a forwardly fore and aft extending leg or arm 13 provided with a transverse pintle or axle 14 mounting a wheel 15, the axis 16 of axle 14 extending lengthwise of the platform and disposed such a distance from the axis of pivot 17 of the rock shaft that in the intermediate position of the platform it coincides with the center of gravity identified by the point 18 in Figure 1 of the platform. This provides for maximum balance of the harvester and permits the use of light linkage to position it. The lever 12 has an integral upright arm 19, the upper end of which is pivoted, as at 20, to the rear end of a diagonal upwardly forwardly or fore and aft extending link element 21 which at its forward end is pivoted, as at 22, to the upper end of an upright arm structure or upstanding element, generally designated 23, which comprises a triangular standard structure including a diagonal element 24 and an upright element 25 which are interconnected at said point 22. The lower end of element 24 is connected at 26 to a hitch or draft frame 27 which at its rear end is connected to the lower end of member 25 by a pintle 28 which passes through the forward end of the side element or beam 3 of the platform framework. The platform is positioned by a diagonal hydraulic motor 29 comprising a cylinder 30 having one end pivotally connected to the member 3 at 30' adjacent to the rear end thereof by a bracket 31 connected to member 3 immediately ahead of the rock shaft 10. The cylinder has a piston operating therein with the stem 32 extending from its opposite end and the free end of the stem 32 is pivoted at 33 to the upright 25 by a bracket 34 connected to said upright adjacent to its upper end, but below the pivot point 22.

It will be readily apparent from Figure 1 that extension of the hydraulic motor operates the tilt control means constituted by the link 25 which rotates in a counterclockwise direction and the link 21 which moves to the left and the lever arm 19 which rotates in a counterclockwise direction which moves the arm or wheel mounting means 13 downwardly, thus elevating the platform. The elevated position of the platform is shown in Figure 1. It will be noted that members 3, 19, 21 and 25 define a pantograph.

Retraction of the hydraulic motor rotates the upright link 25 in a clockwise direction which moves link 21 to the right and rotates the lever 12 in a clockwise direction, lowering the platform. It will be noted that during lowering and lifting of the platform, it pivots on the pintle 28 with the hitch frame 27 and that the degree of forward inclination of the platform in lowered position and its movement up and down is determined by the adjustment of the length of the adjustable link 21, as indicated at 35.

The framework mounts at the forward opposite ends of the platform upright standards 36, each of which has a bracket structure 37 comprising a pair of side plates 38 embracing the standard 36 and interconnected by roller assemblies 39, 40 rotatably engaging the forward and rear edges respectively of the standard for up and down movement thereupon. Each bracket 37 rotatably supports a hollow outer center shaft or tube 41 of a reel 42 in a bearing 43 attached to the inner side plate 38, as seen in Figure 7. The tube 41 encloses a center axle or rod 44 which at each end passes through the side plates 38 of each bracket and between these plates is keyed to a pinion 45 meshing in a track or rack 46 on the related standard. It will be apparent that moving one end of the reel will effect a corresponding movement of the other end through rotation of the center axle 44. One of the brackets 38 is connected at 46' to the upper end of a piston stem 47 of an upright hydraulic motor 48, the piston stem extending at its lower end into a cylinder 49 which at its lower end is pivotally mounted, as at 50, to a bracket 51 attached to the lower end of the related standard. It will be seen from Figure 6 that extension of the hydraulic motor 48 will lift the reel, as shown in phantom lines, and telescoping of the hydraulic motor 48 will permit the reel to descend by gravity.

The reel is rotated by a pair of meshing gears 55, 56 connected respectively to the reel shaft 41 and a countershaft 57 journaled on the adjacent bracket 37 and connected through universally coupled shafting 58 which is journaled on an upright 59 connected to side panel 7, the shafting 58 being connected to a pulley 60 which is belt driven from a pulley 61 keyed to a shaft 62 which extends and is journaled from the outer side wall of a gear case 62' mounted upon the framework. The shaft 62 is keyed to another pulley 63 which drives a belt 65, in turn driving the rear discharge apron pulley 67. The shaft 62 is keyed to a bevel gear 66 which meshes with a companion bevel gear 68 keyed to a shaft 69 which is journaled in end walls 70, 71 of the gear case. The shaft 69 is connected to the platform apron driving pulley 72 and to a crank 73 which drives the sickle pitman 74. The forward extension of shaft 69 is connectible to the power takeoff of an associated tractor or to a separate engine, if desired. The rear end of the driven shaft 69 extends through the rear wall 71 of the gear case into a pump housing 76 which is secured to the wall 71. The rear end of shaft 69 is keyed to a pump gear 77 which meshes and cooperates with a second gear 78 mounted on a stub shaft 80 which is journaled in bearing boss 81 in the end wall 71 of the gear case. The end wall 71 supports an inlet conduit 82 which extends downwardly to the bottom of the gear case which affords an oil sump. The conduit discharges into the intake nip or suction side 83 between the gears which rotate in the direction shown by the arrows in Figure 3 and have a discharge side 84 connected to discharge line 85 which communicates through port 86 in the top of a valve body 87 with a longitudinal distribution bore 88 therein, the valve body being mounted atop the gear case 62'. The bore 88 receives a valve stem 89 for longitudinal and rotative slidable movement therein. The stem comprises a pair of larger diameter lands 90, 91 spaced longitudinally of the stem and defining a bypass chamber 92 therebetween communicating in several positions of the stem, as hereinafter explained, with the inlet port 86 and an outlet port 93 in the bottom of the body 87 which port 93 communicates with a registering port 94 in the top wall 95 of the gear case, the port 94 discharging into the gear case or reservoir 62'. The land 91 comprises a slot or notch 96 therein which in the neutral position, as shown in Figure 2, communicates with a portion of the inlet port 86 which has its remaining portion communicating with the bypass chamber 92. The body 87 is provided at diametrically opposite sides of the bore with substantially horizontal distribution ports 97 and 98, the port 97 being connected through a conduit 99 to the cylinder chamber 100 in the reel lifting cylinder 49. The port 98 is connected through a conduit 101 to a cylinder chamber 102 in the platform operating cylinder 30.

In operation, rotation of the shaft 69 drives the pump which sucks the oil from the sump into its intake side and discharges at its discharge side into the high pressure conduit 85 which discharges fluid in the neutral position, as shown in Figure 2, back into the gear case through inlet 86, the bypass chamber 92, and ports 93 and 94.

To raise the reel, the valve stem 89 is pulled forwardly, as shown in phantom lines in Figure 4, by an operating rod 103 secured by a universal coupling 104 (Figure 2), to the stem and extending forwardly to a position adjacent the operator's station on the tractor (not shown). In the forwardly extended position of the stem, the upper lip 105 of the land 91 defining the forward edge of notch 96, is positioned forwardly of the forward edge 106 of the inlet port 86, thus closing it from communication with the bypass chamber 92. The stem is then rotated 45° to the right (Figure 3) whereby the notch communicates with the port 97 and the inlet port 86, so that fluid is ported to the chamber 100 in cylinder 49 whereby raising the piston rod 47 which lifts the reel through movement of the bracket 38. To lower the reel, the valve stem is moved, while at the inclination to the right, to its neutral position as determined by the compression spring 106 acting between the external end of land 90 and a bracket lug 107 mounted on the gear case, as seen in Figure 2, whereat expansion of spring 106 is limited through abutment of a washer 108 on stem 89 between the spring and the forward end 10 of valve body. The weight of the reel causes it to descend and forces the piston rod 47 to telescope into the cylinder 49 and exhaust the chamber 100 through the conduit 99, port 97, notch 96, through a portion of the inlet port 86 into the bypass chamber 92. To hold the reel adjusted at any desired height, the stem is merely rotated back 45° to its neutral position. Forward movement of stem 89 is limited by a length of slot 109 in the stem and a portion 110 of the spring which passes therethrough and rests against the inner side 111 of the bracket 107.

To raise the platform, the stem is pulled forwardly, as shown in phantom lines in Figure 4, and rotated 45° to the left (Figure 3) to close port 86 from chamber 92 and establish communication from port 86 through notch 96 to port 98 into conduit 101 to fill the cylinder chamber 102 in the cylinder 30 whereby to expand the hydraulic motor 29 whereupon (referring to Figure 1) the standard 23 tends to rotate counterclockwise and moves link 21 to the left which rotates the lever 12 in a counterclockwise direction causing the platform to rise. To hold the platform in any position, the valve stem is rotated to its centered neutral position. To lower the platform, the valve stem is rotated from its centered neutral position 45° to the left (Figure 2) whereupon the weight of the platform causes the linkage to telescope the hydraulic motor 29 whereby exhausting the chamber 102 through conduit 101, port 98, notch 96, inlet port 86, into the bypass chamber 92 which exhausts into the valve casing.

From the foregoing it will be readily apparent that a novel, simple, and efficient hydraulic operating system is disclosed and that the preferred embodiment, as herein discussed, is merely intended by way of explanation and that the invention is limited only by the appended claim.

What is claimed is:

A windrow harvester including a platform having forward and rear edges and lateral ends, a rock shaft rotatably mounted under the platform on a generally horizontal axis intermediate said front and rear edges and having end portions extending outwardly from said ends, an arm connected to each end portion and projecting forwardly therefrom, a wheel mounted on each arm on an axis generally parallel to the rock shaft, an upright lever connected to the rock shaft, a draft frame pivoted to said platform adjacent to one of said end portions and extending ahead of the platform, an upright lever connected to said draft frame and terminating in an upper end portion, a link extending between said levers and pivoted thereto, and a hydraulic ram pivoted at one end to said upper portion of said lever on the draft frame and at its other to said platform at a point adjacent to said rock shaft, said platform providing a crop-receiving upper side, and being generally flat in a fore and aft direction, and said draft frame being generally flat from front to rear, said draft frame extending diagonally upwardly from the forward edge of said platform in the lowered position of the platform whereby said forward edge is capable of being brought close to the ground.

References Cited in the file of this patent

UNITED STATES PATENTS

| | | |
|---|---|---|
| 1,794,720 | Maysent | Mar. 3, 1931 |
| 2,095,364 | Konow | Oct. 12, 1937 |
| 2,507,719 | Kane et al. | May 16, 1950 |
| 2,530,668 | Tallman | Nov. 21, 1950 |
| 2,609,650 | Lindquist | Sept. 9, 1952 |
| 2,652,675 | Hughes et al. | Sept. 22, 1953 |
| 2,654,983 | Peake et al. | Oct. 13, 1953 |
| 2,662,362 | Beasley | Dec. 15, 1953 |
| 2,684,021 | Ratzlaff | July 20, 1954 |
| 2,691,930 | Forgy | Oct. 19, 1954 |